(12) United States Patent
Koseki et al.

(10) Patent No.: US 10,703,300 B2
(45) Date of Patent: Jul. 7, 2020

(54) OPTICAL UNIT

(71) Applicant: FUJITSU TEN LIMITED, Kobe-shi, Hyogo (JP)

(72) Inventors: Tomohisa Koseki, Kobe (JP); Masashi Otomi, Kobe (JP); Yasutaka Yamanaka, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 231 days.

(21) Appl. No.: 15/698,856

(22) Filed: Sep. 8, 2017

(65) Prior Publication Data

US 2018/0126921 A1 May 10, 2018

(30) Foreign Application Priority Data

Nov. 4, 2016 (JP) .................. 2016-215928

(51) Int. Cl.

| B60R 11/04 | (2006.01) |
| B08B 3/02 | (2006.01) |
| B08B 5/02 | (2006.01) |
| B60S 1/52 | (2006.01) |
| B60S 1/56 | (2006.01) |
| G02B 27/00 | (2006.01) |
| B60R 11/00 | (2006.01) |
| B60S 1/48 | (2006.01) |
| B60S 1/54 | (2006.01) |

(52) U.S. Cl.
CPC .............. *B60R 11/04* (2013.01); *B08B 3/02* (2013.01); *B08B 5/02* (2013.01); *B60S 1/52* (2013.01); *B60S 1/56* (2013.01); *G02B 27/0006* (2013.01); *B60R 2011/0043* (2013.01); *B60S 1/481* (2013.01); *B60S 1/54* (2013.01)

(58) Field of Classification Search
None
See application file for complete search history.

(56) References Cited

U.S. PATENT DOCUMENTS

| 2011/0073142 | A1* | 3/2011 | Hattori | B60S 1/0848 134/56 R |
| 2013/0092758 | A1* | 4/2013 | Tanaka | B60S 1/52 239/284.1 |
| 2014/0060582 | A1* | 3/2014 | Hartranft | B60R 11/04 134/18 |
| 2015/0353057 | A1* | 12/2015 | Witte | B08B 3/04 134/115 R |
| 2016/0103316 | A1* | 4/2016 | Rousseau | B60S 1/52 359/509 |
| 2016/0272163 | A1* | 9/2016 | Dreiocker | B60S 1/56 |

FOREIGN PATENT DOCUMENTS

| JP | 2011-228957 A | 11/2011 |
| JP | 2015-224032 A | 12/2015 |

* cited by examiner

*Primary Examiner* — Cristi J Tate-Sims
(74) *Attorney, Agent, or Firm* — Oliff PLC

(57) ABSTRACT

An optical unit includes an optical sensor, a nozzle and a fixing part. The nozzle is positioned and configured to eject fluid onto an optical surface of the optical sensor. The fixing part is slidably engaged over the optical sensor and the nozzle from a side of the optical sensor having the optical surface and integrally fixes the optical sensor and the nozzle to each other.

9 Claims, 19 Drawing Sheets

OPTICAL UNIT

BACKGROUND OF THE INVENTION

Field of the Invention

The invention relates to an optical unit and a method of installing the optical unit.

Description of the Background Art

Conventionally, a camera unit that is mounted on a vehicle and captures an image of surroundings of the vehicle has been known. The images captured by the camera unit, for example, are displayed on a monitor for an assistance in a driver's view or are used for sensing to detect a white line on a road or an object approaching to the vehicle.

In addition, attached substances, for example, rain drops, snowflakes, dust, mud or the like are attached to a lens of the camera unit so that those attached substances may interfere with the foregoing assistance in the driver's view and sensing. Thus, recently a technology that removes attached substances from the lens of the camera unit by ejecting fluid such as wash solution or compressed air onto the lens has also been proposed.

However, in a case where the conventional technology is used, there is room for further improvement in easily installing the optical unit in a narrow space.

Specifically, in a case where the foregoing technology of ejecting fluid is used, a nozzle to eject fluid needs to be placed also in a vicinity of the lens in addition to a camera body. However, since the camera unit for a vehicle is usually installed in a narrow space such as a space surrounded by a design part called a garnish and a vehicle panel, there is a problem that it is difficult to further place the nozzle. Furthermore, even if the nozzle can be placed, it is also required that the camera unit including the nozzle can be easily installed.

In addition, a camera is a kind of optical sensors. Therefore, the problem described above is common to optical units in general including optical sensors such as a radar device which optically detects a target in surroundings of a vehicle.

SUMMARY OF THE INVENTION

According to one aspect of the invention, an optical unit includes an optical sensor, a nozzle that is positioned and configured to eject fluid onto an optical surface of the optical sensor and a fixing part that is slidably engaged over the optical sensor and the nozzle from a side of the optical sensor having the optical surface and integrally fixes the optical sensor and the nozzle to each other.

It is possible to easily install the optical unit in a narrow space.

According to another aspect of the invention, a fluid flow channel of the nozzle increases in width as the fluid flow channel extends from a base end side of the nozzle toward a distal end side of the nozzle and decreases in thickness as the fluid flow channel extends from the base end side of the nozzle toward the distal end side of the nozzle.

Thus, it is possible to eject the fluid from an outlet while pressurizing the fluid and to improve removing performance of attached substances attached to the optical surface.

Therefore, an object of the invention is to provide a technology of easily installing an optical unit in a narrow space.

These and other objects, features, aspects and advantages of the invention will become more apparent from the following detailed description of the invention when taken in conjunction with the accompanying drawings.

DESCRIPTION OF THE EMBODIMENTS

Embodiments of an optical unit and a method of installing the optical unit will be described with reference to the attached drawings. This invention is not limited by the embodiments described below.

Furthermore, the description below explains, as an example, a case in which the optical unit is a camera unit that is mounted on a vehicle. The camera unit is placed on a rear portion of the vehicle to capture images of an area behind the vehicle.

Moreover, an outline of the camera unit 1 according to this embodiment will be described below with reference to FIG. 1A to FIG. 1C, and then a detailed configuration of the camera unit according to this embodiment will be described with reference to FIG. 2A and subsequent drawings.

Figure 1A:
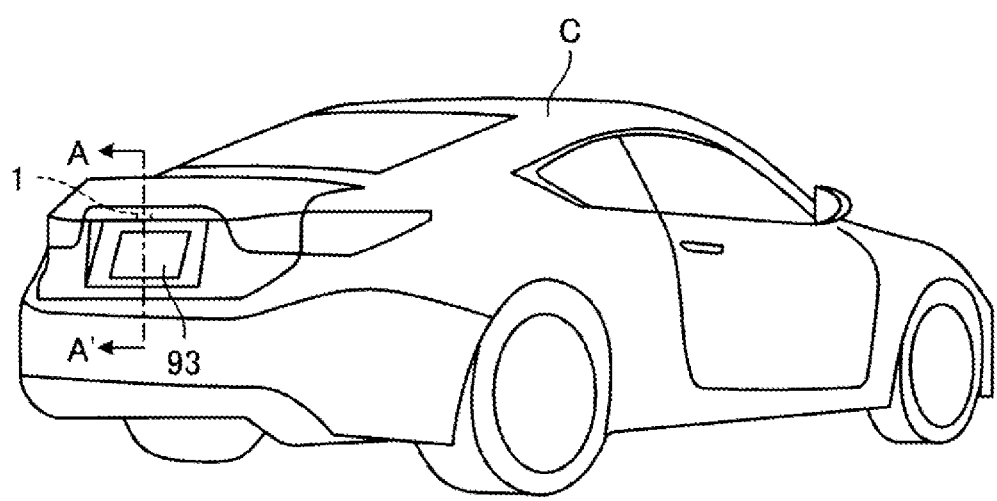
FIG. 1A is a diagram illustrating a vehicle on which a camera unit is mounted.

First, FIG. 1A is a diagram illustrating a vehicle C on which a camera unit 1 is mounted. As shown in FIG. 1A, the camera unit 1 is, for example, installed on a rear portion of the vehicle C above a license plate 93 and in a substantial center in a vehicle width direction of the vehicle C. The camera unit 1 captures, for example, an image for back views of an area behind the vehicle C from the position.

Figure 1B:
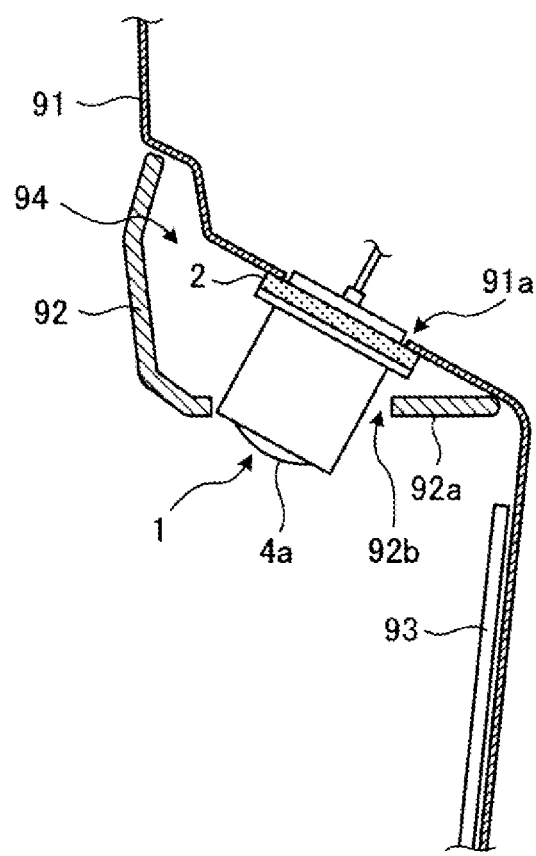
FIG. 1B is a schematic cross-sectional view taken along line A-A' shown in FIG. 1A.

Subsequently, FIG. 1B is a schematic cross-sectional view taken along line A-A' shown in FIG. 1A. In addition, FIG. 1B shows a camera unit 1' without a nozzle to eject fluid for convenience of explanation.

As shown in FIG. 1B, the license plate 93 is attached to a metal vehicle panel 91 on the rear portion of the vehicle C. Furthermore, above the license plate 93, a garnish 92 formed by resin or the like is provided to the vehicle panel 91.

A space 94 capable of placing parts or the like is created between the vehicle panel 91 and the garnish 92. A bottom surface 92a of the garnish 92 is provided such that a planar direction of the bottom surface 92a becomes, for example, substantially parallel to a horizontal direction. In addition, a garnish hole 92b is provided to the bottom surface 92a.

The camera unit 1' is supported on the vehicle panel 91 via a bracket 2. The bracket 2 is fixed so as to cover a vehicle body hole 91a provided to the vehicle panel 91. The camera unit 1' is installed and supported on the bracket 2 in a state in which an image capturing direction is inclined to a vertical direction so as to capture an image of an area behind the vehicle C.

A base end side of the camera unit 1' is placed on an interior side of the vehicle and is connected to a wiring. A distal end side of the camera unit 1' is placed in a space 94 so that a lens 4a is exposed from the garnish hole 92b. In addition, a gap between the camera unit 1' and the garnish 92 is about a few millimeters in some cases, depending on a type of vehicle C, and the space 94 is a narrow space.

Figure 1C:
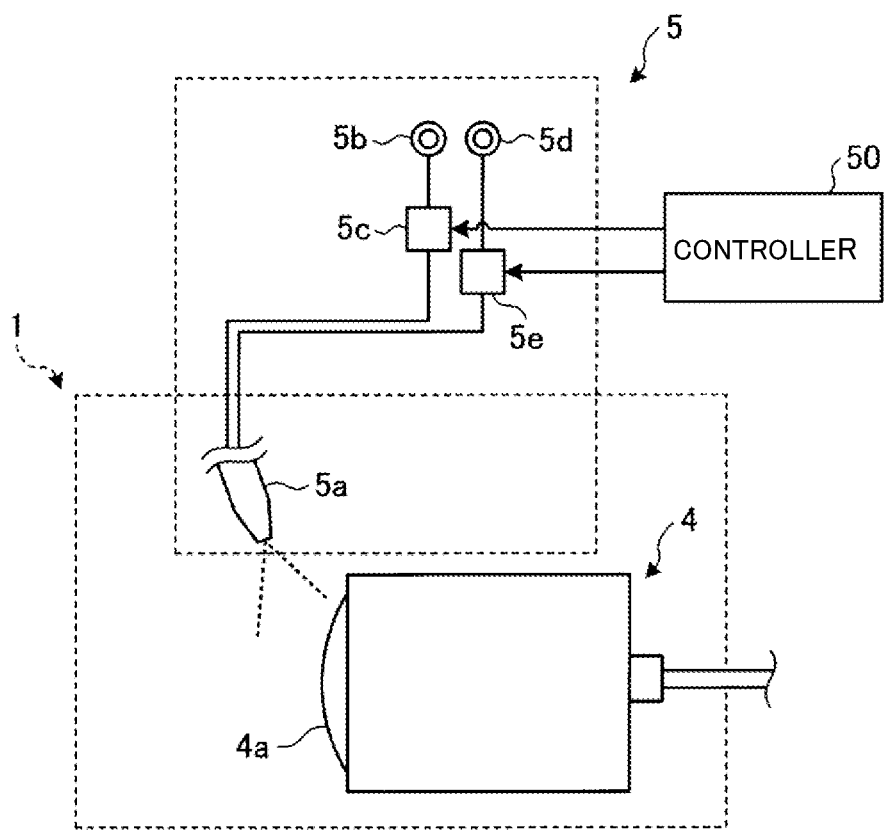
FIG. 1C is a diagram illustrating a schematic configuration of the camera unit according to an embodiment.

Next, FIG. 1C is a diagram illustrating a schematic configuration of the camera unit 1 according to this embodiment. In addition, FIG. 1C shows a functional schematic configuration and an actual device arrangement is not limited to this.

As shown in FIG. 1C, the camera unit 1 according to this embodiment includes a nozzle 5a. The nozzle 5a is also a component part of an attached substance removing apparatus 5 that removes attached substances attached to a lens 4a of a camera 4 such as rain drops, snowflakes, dust, mud or the like and is provided so as to be able to eject fluid onto the lens 4a of the camera 4.

The fluid is, for example, compressed air supplied from an air supply source 5b via a compressed air generator 5c or wash solution supplied from a wash solution supply source 5d via a pump 5e. The wash solution may be water. The compressed air generator 5c and the pump 5e are, for example, controlled by a controller 50 that an in-vehicle apparatus (not shown) includes.

The nozzle 5a ejects one or both of the compressed air and the wash solution supplied based on control of the controller 50 onto the lens 4a.

Since the nozzle 5a needs to eject fluid onto the lens 4a with pressure capable of removing attached substances, the nozzle 5a is placed in a vicinity of the lens 4a. However, as shown in FIG. 1B, the camera unit 1 is placed in a narrow space 94 with a small gap. Thus, some ingenuity in the placement of the nozzle 5a is required.

In a case of including the nozzle 5a, a pipe, for example, a hose to supply the fluid to the nozzle 5a needs to be passed through from the interior side of the vehicle to the space 94.

Figure 2A:
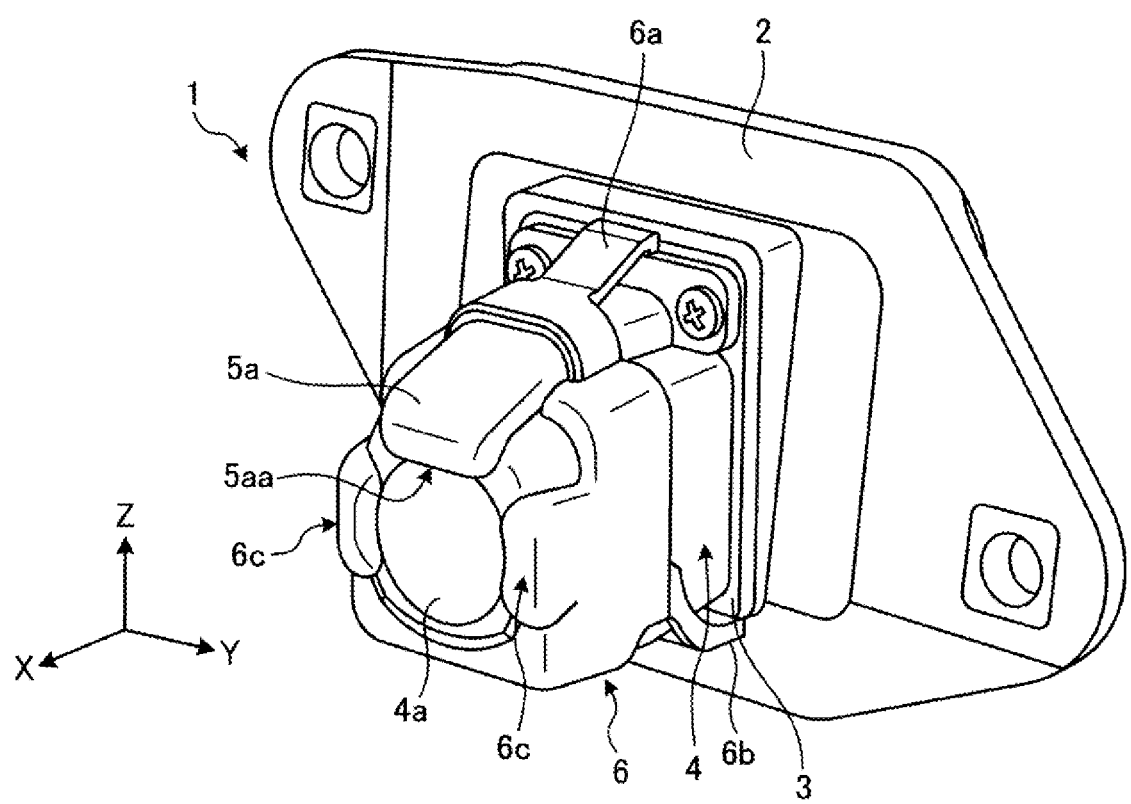
FIG. 2A is a perspective view of the camera unit.
Figure 2B:
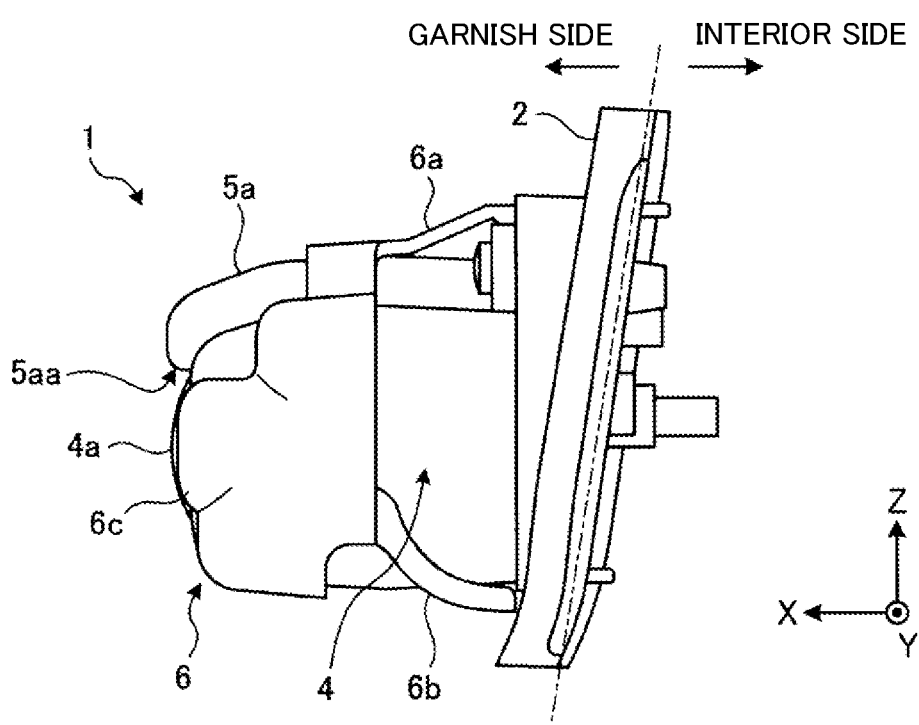
FIG. 2B is a right side view of the camera unit.

Thus, in this embodiment, the camera unit 1 shown in FIG. 2A and subsequent drawings is configured. The camera unit 1 will be subsequently described below with reference to FIG. 2A and the subsequent drawings. FIG. 2A is a perspective view of the camera unit 1. FIG. 2B is a right side view of the camera unit 1.

FIG. 2A and FIG. 2 B show an orthogonal coordinate system in which a front direction of the camera 4 is defined as an X axis direction. The orthogonal coordinate system may be used also in other drawings shown below.

As shown in FIG. 2A and FIG. 2B, the camera unit 1 includes the bracket 2, a packing 3, the camera 4, the nozzle 5a and a holder 6.

The bracket 2 is, for example, formed by resin or the like and is mounted on a bracket mounting surface in which the bracket 2 is to be mounted for the camera unit 1. The bracket mounting surface is, for example, a surface on a side of the garnish 92 of the vehicle panel 91 (refer to FIG. 2B). The vehicle body hole 91a is provided to the bracket mounting surface and the bracket 2 is mounted so as to cover the vehicle body hole 91a. The bracket 2 is a member for positioning the camera unit 1.

Furthermore, the bracket 2 has through-holes which are communicated with the vehicle body hole 91a and through which a wiring to the camera 4 and a pipe to the nozzle 5a pass, respectively. The through-holes are shown in the drawing later.

The packing 3 is, for example, formed by rubber or the like and provided so as to be placed between the bracket 2 and both of the camera 4 and the nozzle 5a that are integrated as described later. The packing 3 is a sealing member.

The camera 4 includes the lens 4a, and a body part of the camera 4 is formed by resin or the like. The nozzle 5a is formed by resin or the like and has a shape that closely fits to an outer periphery of the camera 4. For example, in this embodiment, as shown in FIG. 2A and FIG. 2B, the nozzle 5a has a shape that closely fits in a low height to the outer periphery of the upper portion of the camera 4.

Thus, it is possible to save space required for placing the camera 4 and the nozzle 5a. In other words, the camera unit 1 has a compact structure so that the camera unit 1 can be easily installed in the space 94.

Furthermore, in a case where the nozzle 5a is placed on the upper portion of the camera 4, the nozzle 5a is formed into a shape in which an outlet 5aa for the fluid bends downward toward the lens 4a. Thus, it is possible to eject fluid onto the lens 4a with accuracy.

Figure 3A:
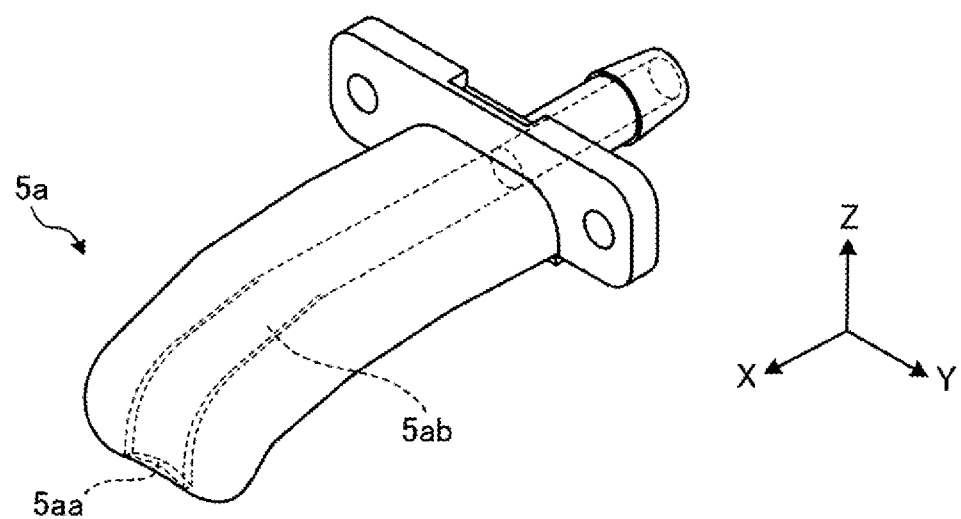
FIG. 3A is a perspective transparent view of a nozzle.
Figure 3B:
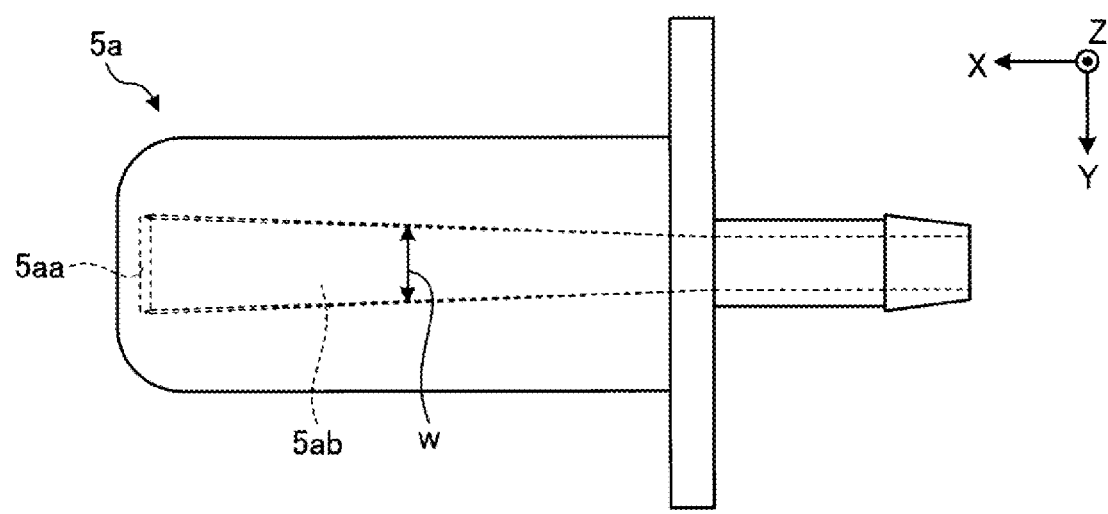
FIG. 3B is a perspective plan view of the nozzle.
Figure 3C:
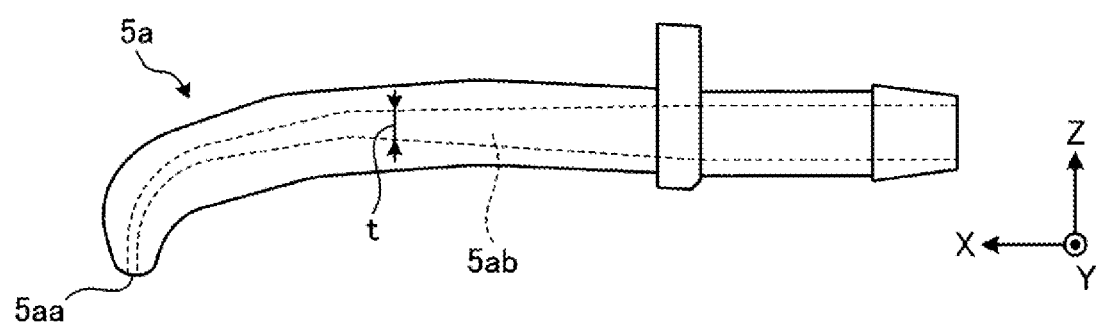
FIG. 3C is a right side perspective view of the nozzle.

Here, a fluid flow channel formed inside the nozzle 5a will be described with reference to FIG. 3A to FIG. 3C. FIG. 3A is a perspective transparent view of the nozzle 5a. FIG. 3B is a perspective plan view of the nozzle 5a. FIG. 3C is a right side perspective view of the nozzle 5a.

As shown in FIG. 3A, a fluid flow channel 5ab is formed inside the nozzle 5a. The fluid flow channel 5ab is formed to have a different cross-sectional shape on a base end side (interior side of the vehicle) of the nozzle 5a from a cross-sectional shape on a distal end side (outlet 5aa side) of the nozzle 5a.

Specifically, as shown in FIG. 3B, the fluid flow channel 5ab increases in a width w as the fluid flow channel 5ab extends from the base end side of the nozzle 5a toward the distal end side of the nozzle 5a. Moreover, as shown in FIG. 3C, the fluid flow channel 5ab decreases in a thickness t as the fluid flow channel 5ab extends from the base end side of the nozzle 5a toward the distal end side of the nozzle 5a.

Thus, it is possible to eject the fluid from the outlet 5aa while pressurizing the fluid and to improve removing performance of attached substances attached to the lens 4a. As shown in FIG. 3A to FIG. 3C, it is preferable that the fluid flow channel 5ab is formed such that the cross-sectional shape of the fluid flow channel 5ab gradually changes. As a result, it is possible to reduce pressure loss.

FIG. 2A and FIG. 2 B will be described again. The holder 6 is a member which integrally fixes the camera 4 and the nozzle 5a. The holder 6 is formed by resin or the like and has a first fitting part 6a and a second fitting part 6b.

Although it is not shown in FIG. 2A and FIG. 2B, the camera 4 and the nozzle 5a have concave portions on base end sides, respectively. The first fitting part 6a has a convex portion corresponding to the concave portion of the nozzle 5a and the second fitting part 6b has a convex portion corresponding to the concave portion of the camera 4, respectively. These concave portions and convex portions will be shown in FIG. 4A and FIG. 4B later.

The holder 6 covers the camera 4 and the nozzle 5a which are closely fitted to each other. The convex portions are fitted in the corresponding concave portions so that the camera 4 is integrally fixed with the nozzle 5a. Thus, it is possible to prevent rattles of the nozzle 5a to the camera 4. Moreover, the camera 4 can be easily integrated with the nozzle 5a to have a compact structure.

Since the holder 6 has elasticity due to a material of the holder 6, the holder 6 snap-fits to the camera 4 and the nozzle 5a. Thus, it is possible to contribute to easy installation of the camera unit 1.

The holder 6 has light shading parts 6c. The light shading parts will be described later with reference to FIG. 5A and FIG. 5B.

Figure 4A:
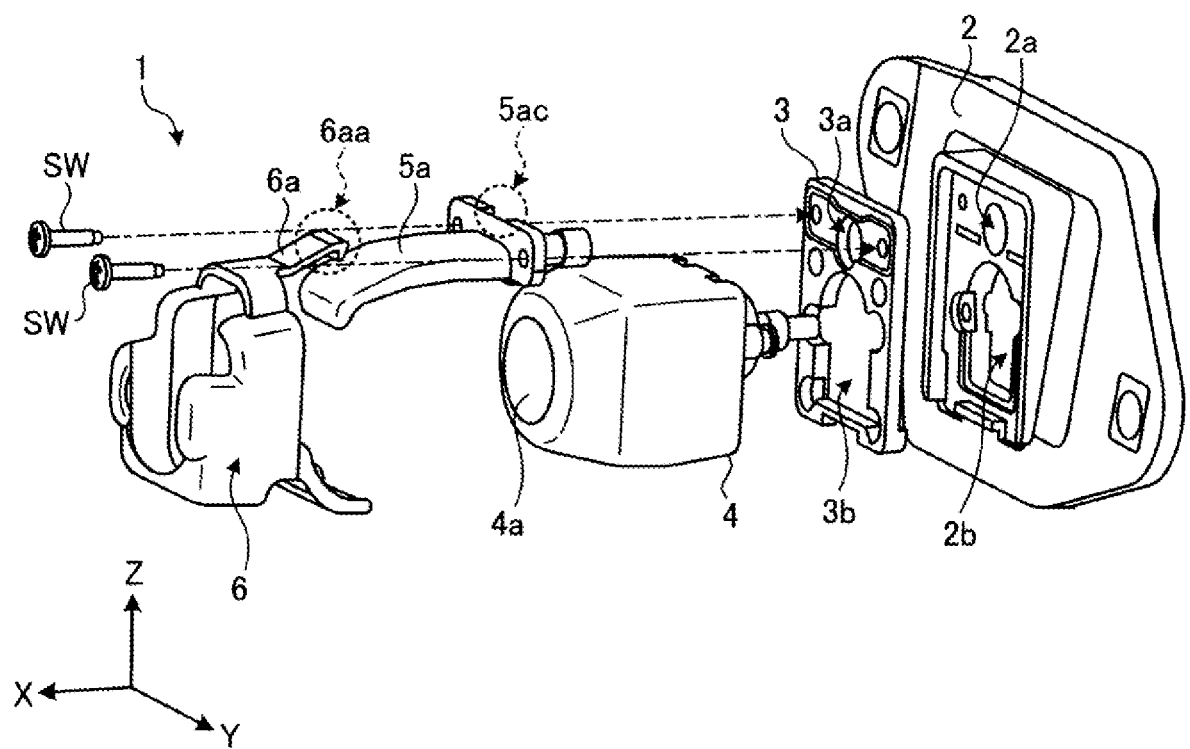
FIG. 4A is an explanatory diagram (part 1) illustrating a method of installing the camera unit.
Figure 4B:
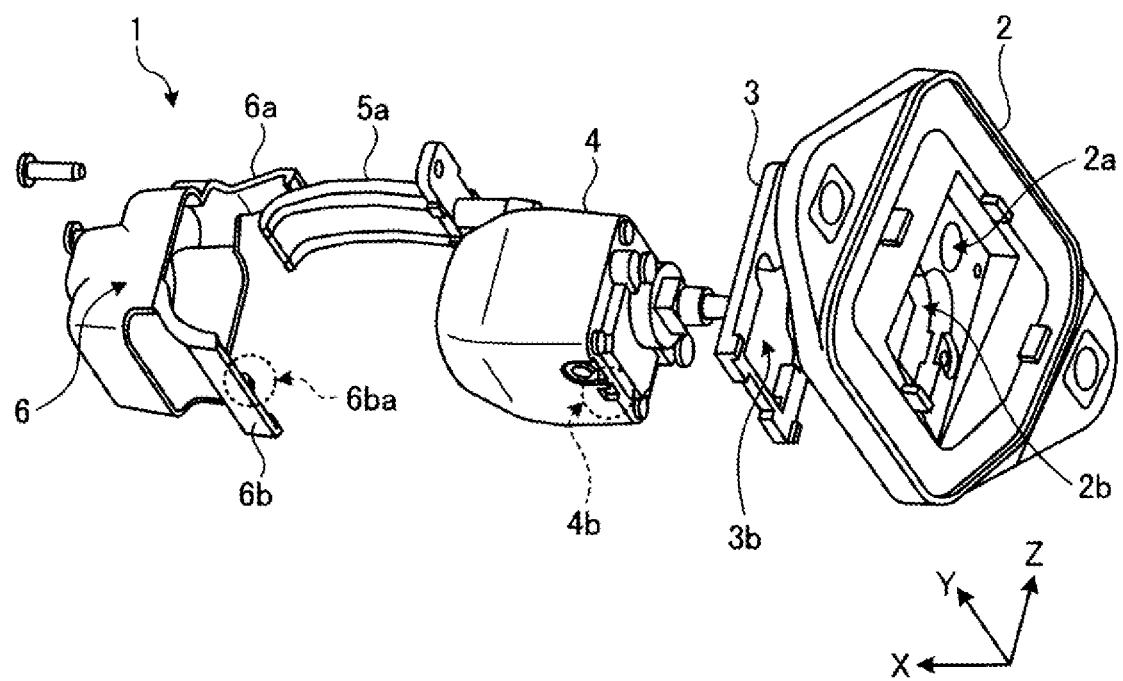
FIG. 4B is an explanatory diagram (part 2) illustrating the method of installing the camera unit.
Figure 4C:
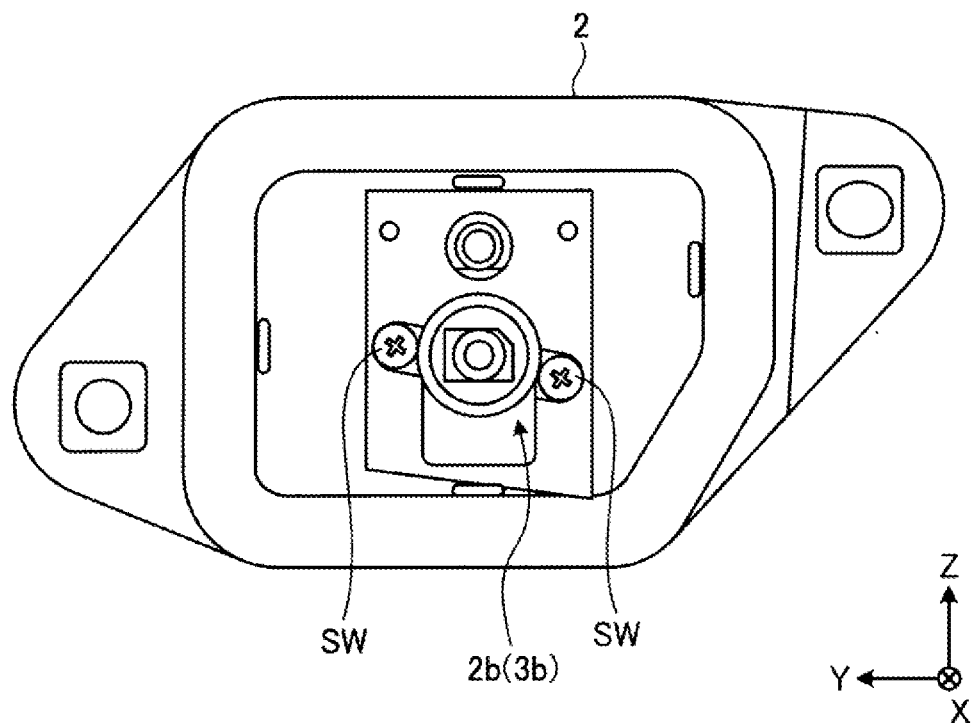
FIG. 4C is an explanatory diagram (part 3) illustrating the method of installing the camera unit.

Next, the method of installing the camera unit 1 will be described more specifically with reference to FIG. 4A to FIG. 4C. FIG. 4A to FIG. 4C are explanatory diagrams illustrating the method of installing the camera unit 1 (part 1) to (part 3).

As shown in FIG. 4A and FIG. 4B, in the camera unit 1, the bracket 2 is first mounted on the vehicle panel 91 as the bracket mounting surface. The bracket 2 has through-holes 2a and 2b which are communicated with the vehicle body hole 91a. Since the through-holes 2a and 2b are placed in a close proximity to each other, only one vehicle body hole 91a is required. For example, there is no need to separately provide a vehicle body hole for the pipe to the nozzle 5a. Therefore, it is possible to contribute to easy installation.

Moreover, the bracket 2 is configured to support the camera 4 and the nozzle 5a which are closely fitted to each other, at a mounted position of the bracket 2 on the bracket mounting surface. Therefore, the bracket 2 is configured to position the camera 4 and the nozzle 5a at an appropriate position to the bracket mounting surface.

The packing 3 is attached to the bracket 2. The packing 3 has through-holes 3a and 3b. The through-hole 3a is communicated with the through-hole 2a and the through-hole 3b is communicated with the through-hole 2b.

The camera 4 is placed on the packing 3. As shown in FIG. 4C, the camera 4 is fastened by screws SW from a back side of the bracket 2. The wiring of the camera 4 passes through the through-holes 3b and 2b to the vehicle body hole 91a.

As shown in FIG. 4A and FIG. 4B, the nozzle 5a is placed on the upper portion of the camera 4. At this time, the pipe on the base end side of the nozzle 5a passes through the through-holes 3a and 2a to the vehicle body hole 91a.

As shown in FIG. 4A, the nozzle 5a is fastened by screws SW from a front side of the camera 4 (i.e. a front side of the bracket 2).

Then, the holder 6 is provided so as to cover the camera 4 and the nozzle 5a. At this time, as shown in FIG. 4A, a convex portion 6aa of the first fitting part 6a is fitted in a concave portion 5ac provided on the base end side of the nozzle 5a. Furthermore, as shown in FIG. 4B, a convex portion 6ba of the second fitting part 6b is fitted in a concave portion 4b provided on the base end side of the camera 4. Thus, the camera 4 can be integrally fixed with the nozzle 5a by the holder 6.

Figure 5A:
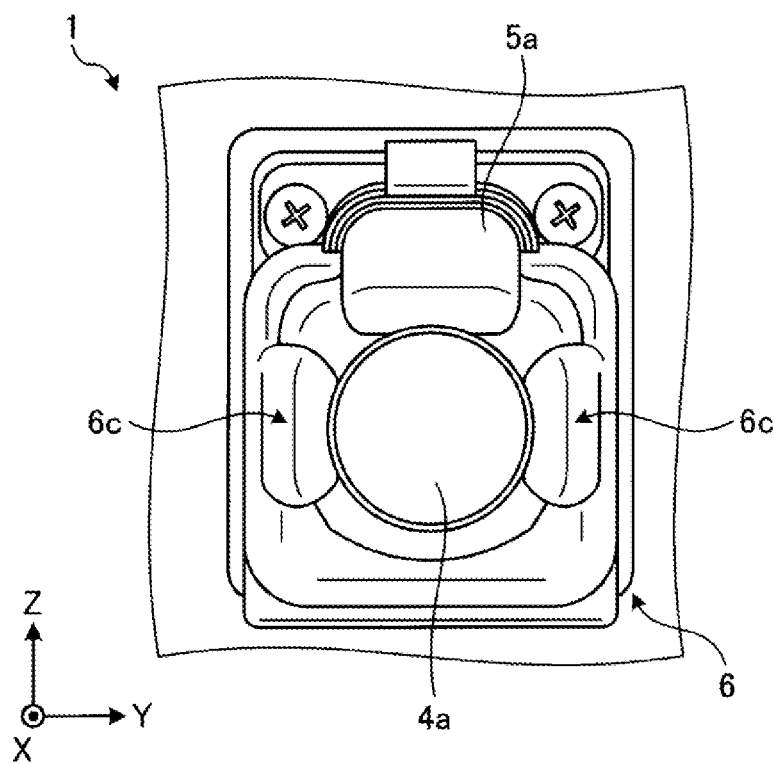
FIG. 5A is an explanatory diagram (part 1) of light shading parts.
Figure 5B:
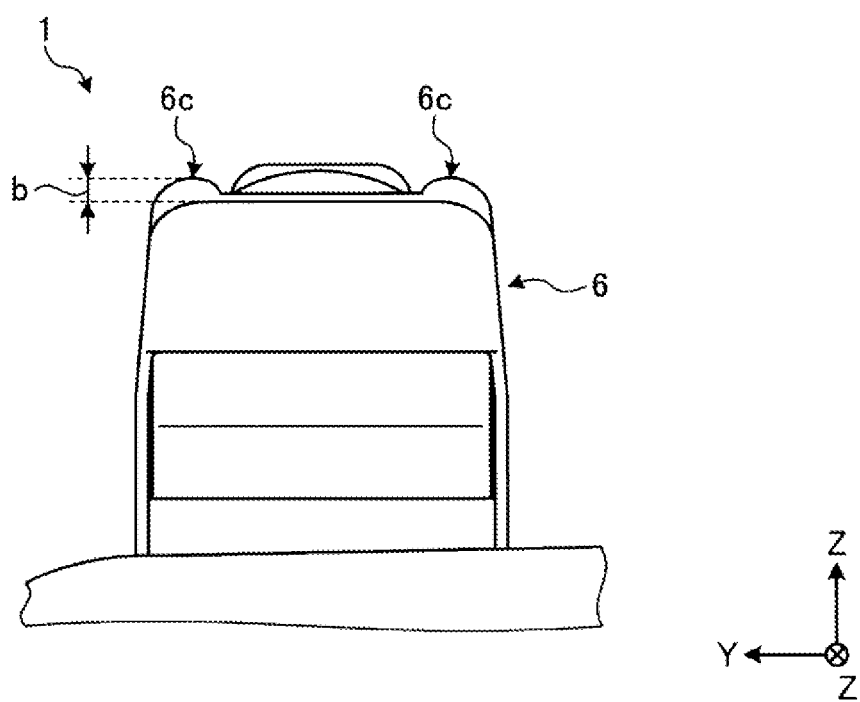
FIG. 5B is an explanatory diagram (part 2) of the light shading parts.

Next, a status of the camera unit 1 after installation will be described with reference to FIG. 5A to FIG. 5D. FIG. 5A and FIG. 5B are explanatory diagrams (part 1) and (part 2) of the light shading parts 6c. FIG. 5A is a front view of the camera unit 1 after installation and FIG. 5B is a bottom view of the camera unit 1 after installation.

Figure 5C:
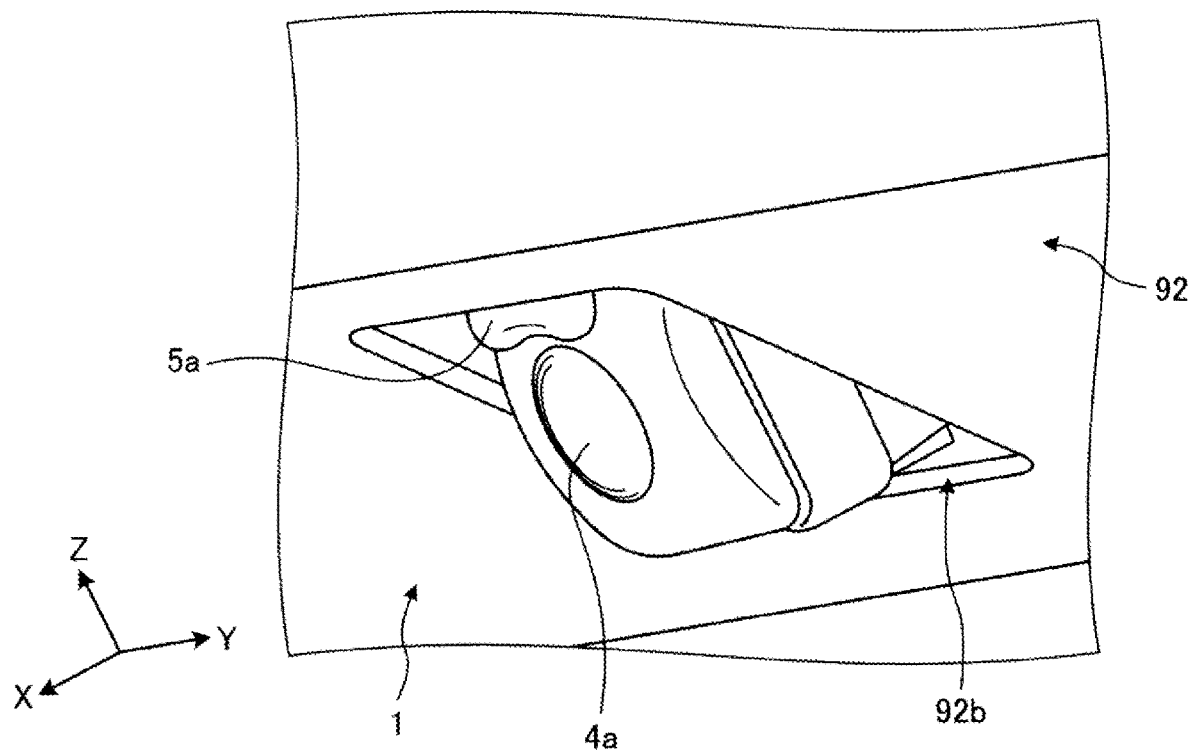
FIG. 5C is a diagram (part 1) illustrating a positional relation between a camera and the nozzle.
Figure 5D:
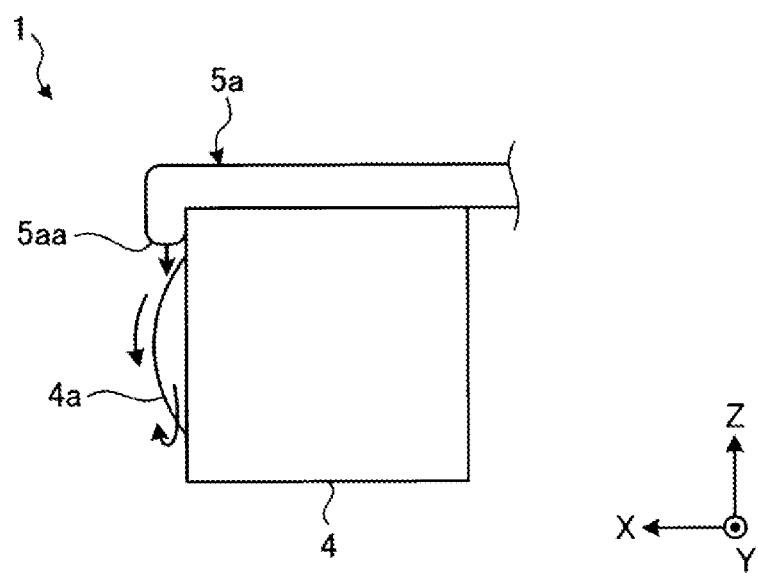
FIG. 5D is a diagram (part 2) illustrating the positional relation between the camera and the nozzle.

FIG. 5C and FIG. 5D are diagrams (part 1) and (part 2) illustrating the positional relation between the camera 4 and the nozzle 5a. FIG. 5C is a perspective view from the outside of the garnish 92 after installation and FIG. 5D is a right side schematic diagram.

As shown in FIG. 5A and FIG. 5B, the holder 6 has the light shading parts 6c. Each of the light shading parts 6c is formed by protruding a part of an area which surrounds an outer periphery of the lens 4a by a height b, and is placed, for example, on right and left sides of the lens 4a in pairs. The height b is slightly lower than a height of the lens 4a.

By providing the light shading parts 6c, it is possible to suppress lens flare and ghost images which might be caused by a light source such as a license lamp.

As shown in FIG. 5C, in the camera unit 1 according to this embodiment, as described above, the nozzle 5a is formed to have a low height so that the nozzle 5a is closely fitted to the camera 4, and the outlet 5aa droops toward the lens 4a. Thus, the nozzle 5a can be placed in the gap between the camera 4 and the garnish 92. In other words, there is no need to enlarge the garnish hole 92b in order to place the nozzle 5a. Therefore, it is possible to easily install the camera unit 1.

As shown in FIG. 5D, the nozzle 5a ejects the fluid from the outlet 5aa in the direction in which the outlet 5aa droops. In this case, the fluid flows downward along a surface of the lens 4a by Coanda effect (refer to arrows in the figure). Thus, it is possible to remove attached substances on the entire surface of the lens 4a.

Figure 6:
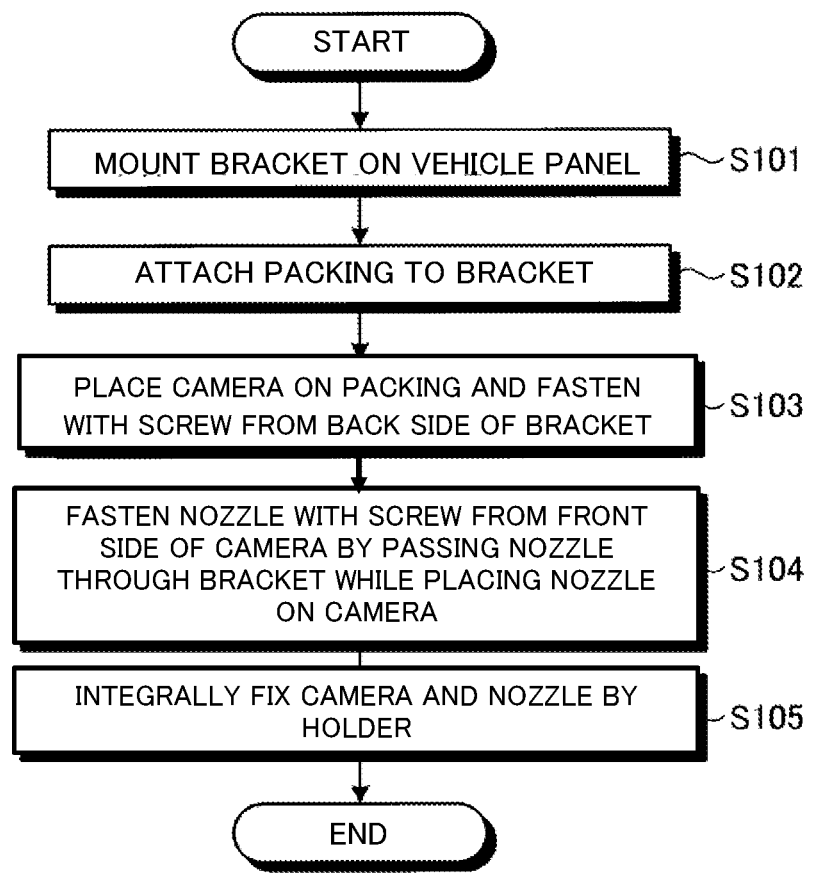
FIG. 6 is a flowchart showing process steps of the method of installing the camera unit according to the embodiment.

Next, process steps of the method of installing the camera unit 1 according to this embodiment will be described with reference to FIG. 6. FIG. 6 is a flowchart showing process steps of the method of installing the camera unit 1 according to the embodiment. Here, an actor will be described as a worker. Furthermore, explanation of installation and removal of the garnish 92 will be omitted.

As shown in FIG. 6, the worker first mounts the bracket 2 on the vehicle panel 91 (a step S101). Then, the worker attaches the packing 3 to the bracket 2 (a step S102).

The worker places the camera 4 on the packing 3 and fastens the camera 4 with screws from the back side of the bracket 2 (a step S103). The worker fastens the nozzle 5a with screws from the front side of the camera 4 by passing the nozzle 5a through the bracket 2 while placing the nozzle 5a on the camera 4 (a step S104).

Then, the worker integrally fixes the camera 4 and the nozzle 5a by the holder 6 (a step S105) and completes the installation of the camera unit 1. The worker can easily install the camera unit 1 in a narrow space by these process steps.

As described above, the camera unit 1 (which corresponds to an example of the "optical unit") according to this embodiment includes the camera 4 (which corresponds to an example of the "optical sensor"), the nozzle 5a and the holder 6 (which corresponds to an example of the "fixing part").

The nozzle 5a is positioned and configured to eject the fluid onto the lens 4a (which corresponds to an example of the "optical surface") of the camera 4. The holder 6 is slidably engaged over the camera 4 and the nozzle 5a from a side of the lens 4a and integrally fixes the camera 4 and the nozzle 5a to each other.

Therefore, according to this embodiment, it is possible to easily install the camera unit 1 in a narrow space.

Other Embodiments

In the foregoing embodiment, the case in which there is no need to separately provide the vehicle body hole for the pipe to the nozzle 5a is described. However, the vehicle body hole for the pipe to the nozzle 5a should be necessarily provided in some cases for structural reasons of Vehicle C or the like.

However, in many cases, a soft hose or the like is selected for the pipe to send fluid such as compressed air to the nozzle 5a from necessity of providing flexibility to a position in which the camera unit 1 is installed. Thus, if the hose is passed through the vehicle body hole for the pipe as it is, the hose is bent or damaged so that removing performance might be reduced without ensuring a desired cross-section of the flow channel.

Figure 7:
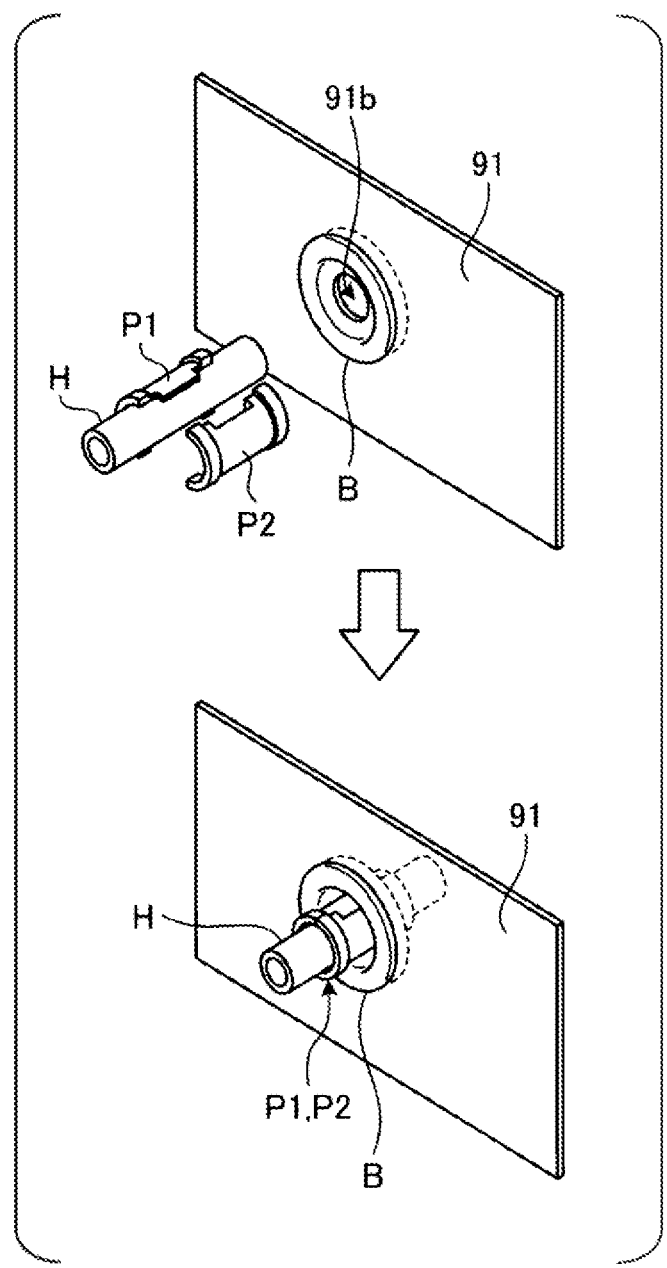
FIG. 7 is a diagram illustrating an application example in which a pipe to the nozzle is passed through a dedicated hole of a vehicle body.

An application in this case will be described with reference to FIG. 7. FIG. 7 is a diagram illustrating an application example in which the pipe to the nozzle 5a is passed through a dedicated vehicle body hole 91b. A hose H is used as the pipe.

As shown in FIG. 7, the vehicle body hole 91b dedicated for the hose H is provided to the vehicle panel 91. In this case, it is preferable that a periphery of the vehicle body hole 91b is reinforced by a reinforcing member B. The reinforcing member B is, for example, a bush made of an elastic material.

Furthermore, it is preferable that the hose H is held via a cylindrical reinforcing member P in a through-portion. The reinforcing member P is divided into two members P1 and P2 in a direction parallel to an axis direction. The reinforcing member P holds the hose H in the through-portion in a state in which the hose H is sandwiched by the members P1 and P2.

Thus, it is possible to prevent pressure loss of the fluid due to bending or the like of the through-portion of the hose H. Moreover, since the reinforcing member P is divided into the members P1 and P2, it is possible to easily attach the reinforcing member P.

In order to supply wash solution to the nozzle 5a, a method of supplying the wash solution to the nozzle 5a is considered, in which the wash solution supply source 5d is used as an existing wash solution tank for a window, the pump 5e is used as a washer pump and a supply line of the wash solution is branched.

Figure 8A:
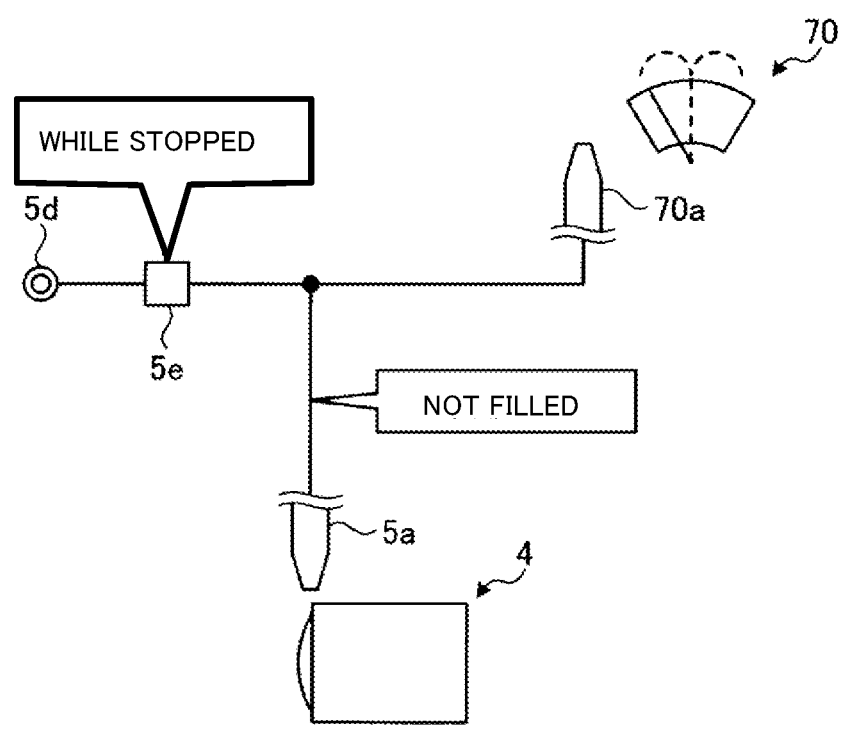
FIG. 8A is an explanatory diagram (part 1) of an application example in which wash solution is branched and supplied.
Figure 8B:
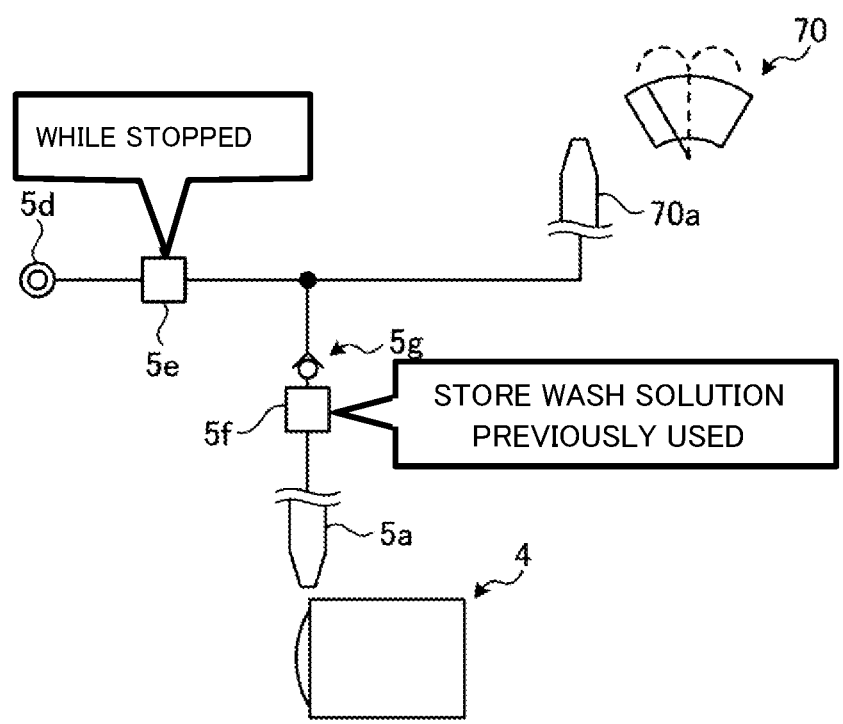
FIG. 8B is an explanatory diagram (part 2) of the application example in which wash solution is branched and supplied.

The application in this case will be described with reference to FIG. 8A and FIG. 8B. FIG. 8A and FIG. 8B are explanatory diagrams (part 1) and (part 2) of an application example in which the wash solution is branched and supplied to the nozzle 5a. FIG. 8A shows a problem when the wash solution is branched and supplied as it is.

As shown in FIG. 8A, the supply line of the wash solution to the nozzle 5a is branched from a supply line to a nozzle 70a of a window washer 70 which is led from the wash solution supply source 5d via the pump 5e.

In this case, while the pump 5e works and the window washer 70 is used, the supply line to the nozzle 5a is also filled with the wash solution. However, as shown in FIG. 8A, while the pump 5e stops, the supply line to the nozzle 5a is not filled with the wash solution. Thus, even if the attached substance removing apparatus 5 is operated under such circumstances, the wash solution is not immediately supplied and the reaction speed slows down.

Therefore, in order to cope with the problem, as shown in FIG. 8B, for example, it is recommended that a temporary water storage part 5f and a check valve 5g are provided on the way of the supply line to the nozzle 5a. The temporary water storage part 5f is, for example, a pouched water storage container and stores the wash solution filled to the supply line to the nozzle 5a while using the window washer 70.

The check valve 5g is provided between the temporary water storage part 5f and a branch point of the supply line so as to stop reverse flow of the wash solution from the temporary water storage part 5f to the branch point. By this configuration, as shown in FIG. 8B, even when the pump 5e stops, the temporary water storage part 5f stores the wash solution which was previously used for the window washer 70. That is to say, when using the window washer 70, the wash solution for the nozzle 5a can be automatically refilled. Thus, when operating the attached substance removing apparatus 5, it is possible to eject the wash solution from the nozzle 5a always with a good response.

Each foregoing embodiment shows a case in which the optical sensor is the camera 4 and the optical unit is the camera unit 1, as an example. However, each embodiment can be applied to an optical unit such as a radar apparatus which optically detects a target in surroundings of a vehicle.

In a case of the camera unit 1, the optical surface is the lens 4a. However, in a case of the radar apparatus, the optical surface is a surface in which radio waves are received and/or transmitted. Therefore, if a light emitting part of the radar apparatus has a transparent cover, the optical surface is this cover so that the fluid ejected from the nozzle 5a removes the attached substances on the cover.

It is possible for a person skilled in the art to easily come up with more effects and modifications. Thus, a broader modification of this invention is not limited to specific description and typical embodiments described and expressed above. Therefore, various modifications are possible without departing from the general spirit and scope of the invention defined by claims attached and equivalents thereof.

While the invention has been shown and described in detail, the foregoing description is in all aspects illustrative and not restrictive. It is therefore understood that numerous other modifications and variations can be devised without departing from the scope of the invention.

What is claimed is:
1. An optical unit comprising:
  an optical sensor;
  a nozzle that is positioned and configured to eject fluid onto an optical surface of the optical sensor, the nozzle including an internal fluid flow channel and a fluid outlet that receives the fluid from the internal fluid flow channel and that ejects the fluid directly onto the optical surface of the optical sensor, the nozzle being fitted to an outer periphery of the optical sensor; and
  a holder that i) is a separate piece from the optical sensor and the nozzle and is movable relative to the optical sensor and the nozzle, including the fluid outlet of the nozzle, before being engaged with the optical sensor and the nozzle, ii) is slidably engaged over the optical sensor and the nozzle from a side of the optical sensor having the optical surface without coming between the optical sensor and the nozzle and iii) integrally fixes the optical sensor and the nozzle to each other.

2. The optical unit according to claim 1, wherein
the internal fluid flow channel of the nozzle i) increases in width as the internal fluid flow channel extends from a base end side of the nozzle toward a distal end side of the nozzle and ii) decreases in thickness as the internal fluid flow channel extends from the base end side of the nozzle toward the distal end side of the nozzle.

3. The optical unit according to claim 1, wherein
the nozzle has a shape that closely fits to the outer periphery of the optical sensor.

4. The optical unit according to claim 3, wherein
the nozzle is placed on an upper portion of the optical sensor, and the fluid outlet has a shape that bends downward toward the optical surface.

5. The optical unit according to claim 3, wherein
the optical sensor and the nozzle have concave portions on base end sides, respectively, and
the holder i) has convex portions corresponding in shape to the concave portions, respectively, ii) covers the optical sensor and the nozzle which are closely fitted to each other, and iii) integrally fixes the optical sensor and the nozzle to each other such that the convex portions are fitted in the corresponding concave portions.

6. The optical unit according to claim 5, wherein
the holder has elastic tabs that snap-fit to the optical sensor and the nozzle.

7. The optical unit according to claim 1, wherein
the holder has light shading parts formed by protrusions which surround an outer periphery of the optical surface.

8. The optical unit according to claim 3, further comprising;
a bracket that i) has through-holes through which a wiring to the optical sensor and a pipe to the nozzle pass, respectively, ii) is configured to be mounted on a bracket mounting surface, and iii) is configured to support the optical sensor and the nozzle which are closely fitted to each other, on the bracket mounting surface.

9. A method of installing the optical unit of claim 1, the method comprising the steps of:
mounting a bracket on a bracket mounting surface;
attaching a sealing member to the bracket;
placing the optical sensor of the optical unit on the sealing member and fixing the optical sensor to the bracket from a back side of the bracket;
passing the nozzle of the optical unit through the bracket and fixing the nozzle to the bracket from a front side of the bracket while the nozzle is closely fitted to the optical sensor; and
integrally fixing the optical sensor and the nozzle to each other by sliding the holder of the optical unit over the optical sensor and the nozzle from the side of the optical sensor having the optical surface.

* * * * *